United States Patent
Becker et al.

[11] 4,012,118
[45] Mar. 15, 1977

[54] TEXTURE TRANSFORMATIONS IN OPTICALLY NEGATIVE LIQUID CRYSTALS

[75] Inventors: James H. Becker, Denton, Tex.; Joseph J. Wysocki, Webster, N.Y.

[73] Assignee: Xerox Corporation, Stamford, Conn.

[22] Filed: Jan. 22, 1976

[21] Appl. No.: 651,307

Related U.S. Application Data

[62] Division of Ser. No. 506,141, Sept. 16, 1974, Pat. No. 3,960,439.

[52] U.S. Cl. .......................................... 350/160 LC
[51] Int. Cl.² .............................................. G02F 1/13
[58] Field of Search ............................ 350/160 LC

[56] References Cited
UNITED STATES PATENTS 3,642,348  2/1972  Wysocki et al. ............ 350/160 LC
3,697,150 10/1972  Wysocki et al. ............ 350/160 LC

*Primary Examiner*—Edward S. Bauer
*Attorney, Agent, or Firm*—James J. Ralabate; Richard A. Tomlin; George J. Cannon

[57] ABSTRACT

A system for transforming an optically negative liquid crystalline composition from the focal-conic texture state to the Grandjean texture state by means of an applied electrical field which may be a D.C. electrical field or a relatively low frequency A.C. electrical field. Imaging and display systems wherein a member comprising a film of an optically negative liquid crystalline composition is imaged in a desired image configuration by the electrical field induced texture transformation system are also described.

3 Claims, 6 Drawing Figures

TEXTURE TRANSFORMATIONS IN OPTICALLY NEGATIVE LIQUID CRYSTALS

This is a division of application Ser. No. 506,141, filed Sept. 16, 1974 now U.S. Pat. No. 3,960,439.

BACKGROUND OF THE INVENTION

This invention relates generally to a liquid crystal texture transformation system and more particularly to imaging systems wherein an imaging member comprises an optically negative liquid crystalline composition.

Liquid crystalline substances exhibit physical characteristics some of which are typically associated with liquids and others which are typically unique to solid crystals. The name "liquid crystals" has become generic to subtances exhibiting these dual properties. Liquid crystals are known to appear in three different forms: the smectic, nematic and cholesteric forms. These structural forms are sometimes referred to as mesophases thereby indicating that they are states of matter intermediate between the liquid and crystalline states. The three mesophase forms of liquid crystals mentioned above are characterized by different physical structures wherein the molecules of the compound are arranged in a manner which is unique to each of the three mesomorphic structures. Each of these three structures is well known in the liquid crystal art.

Cholesteric liquid crystals are known to exhibit various observable textures. For example, cholesteric liquid crystalline materials may adopt a homeotropic, a focal-conic or a Grandjean plane texture as modifications of the cholesteric mesophase itself as is described in Molecular Structure and the Properties of Liquid Crystals, Gray, G. W., Academic Press, London, 1962, pp. 39-54.

It is known in the art that a cholesteric liquid crystalline material in the Grandjean texture state may be transformed to the focal-conic texture state by application of D.C. electrical fields or by relatively low frequency A.C. electrical fields. For a detailed description of this advantageous method see U.S. Pat. No. 3,642,348 to Wysocki et al. It has further been disclosed that a cholesteric liquid crystalline material in the focal-conic texture state may be transformed to the Grandjean texture state by the application of relatively high frequency A.C. electrical fields. A detailed description of this method is provided in U.S. Pat. No. 3,680,950 to Haas et al.

It is also known in the art that an optically negative liquid crystalline material may be transformed to the optically positive state by the application of electrical fields. See, for example, U.S. Pat. No. 3,652,148 to Wysocki et al. There are also disclosed systems for obtaining this result wherein the optically negative liquid crystalline material includes an additive of electrophoretic-like or dipolar material dispersed therein. For an extensive description of this type of system see U.S. Pat. No. 3,697,150 to Wysocki.

The present invention relates to a texture transformation system in which an optically negative liquid crystalline composition is transformed from the focal-conic state to the Grandjean texture state by means of an applied electrical field.

SUMMARY OF THE INVENTION

It is therefore an object of this invention to provide a novel liquid crystal texture transformation system.

It is another object to provide a liquid crystal imaging system wherein an optically negative liquid crystalline material is transformed from the focal-conic texture state to the Grandjean texture state.

It is a further object to provide an imaging system comprising an imaging member comprising a film of an optically negative liquid crystalline composition which includes an additive of electrophoretic-like or dipolar material.

It is still another object to transform an optically negative liquid crystalline material from the focal-conic texture state to the Grandjean texture state by the application of a D.C. electrical field.

Still further it is an object to transform an optically negative liquid crystalline material from the focal-conic texture state to the Grandjean texture state by the application of a relatively low frequency A.C. electrical field.

Another object is to provide a transient imaging system.

It is yet another object of the invention to provide a color imaging system.

Another object is to provide an imaging system wherein an imaging member comprises an optically negative liquid crystalline material which has a negative dielectric anisotropy at the operative conditions.

BRIEF SUMMARY OF THE INVENTION

These and other objects and advantages are accomplished in accordance with the invention by providing an optically negative liquid crystalline composition in the focal-conic texture state and transforming the composition to the Grandjean texture state by the application of a D.C. electrical field or a relatively low frequency A.C. electrical field.

The optically negative liquid crystalline composition comprises optically negative liquid crystalline material having a negative dielectric anisotropy at the operative conditions and an additive material which may be an electrophoretic-like or a dipolar material. The novel focal-conic to Grandjean texture transformation system may be utilized to image a liquid crystalline imaging member.

It should be noted that by relatively low frequency A.C. electrical field is meant a frequency which does not appreciably suppress ion flow in the composition. The frequency in any particular instance is dependent upon the type of ions present in the composition, their charge and mass, the viscosity of the composition, etc. Typically, A.C. electrical fields having a frequency below about 1 KHertz are suitable.

BRIEF DESCRIPTION OF THE DRAWINGS

For a better understanding of the invention as well as other objects and further features thereof, reference is made to the following detailed disclosure of various preferred embodiments thereof taken in conjunction with the accompanying drawings wherein.

DESCRIPTION OF THE PREFERRED EMBODIMENTS

Figure 1:
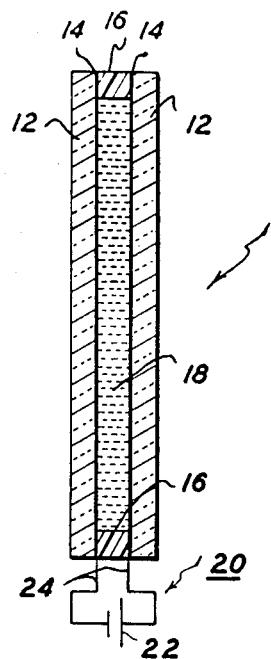
FIG. 1 is a partially schematic, cross-sectional view of an embodiment of a liquid crystalline imaging member.

FIG. 1 illustrates a liquid crystalline electrooptic imaging member 10 wherein a pair of supporting plates 12 having a conductive coating 14 upon the contact surface thereof comprise a pair of parallel electrodes. The supporting plates 12 and the conductive coatings 14 may be substantially transparent. An imaging member wherein both electrodes are at least substantially transparent is preferred where the cell is to be viewed with transmitted light; however the member may also be viewed in reflected light in which case only one electrode need be substantially transparent and the other may be opaque or translucent. The electrodes are separated by spacer or gasket member 16 which contains voids which form one or more shallow cups which may contain the liquid crystalline composition film or layer 18 which comprises the active element in the cell 10. An electrical field is created between the electrodes by an external circuit 20 which comprises a source of potential 22 which is connected across the two electrodes through leads 24. The potential source 22 is D.C., A.C. or suitable combinations of both. The circuit 20 may also include suitable switching means (not shown).

Initially, the optically negative liquid crystalline compositon which comprises layer 18 is provided in the focal-conic texture state, sometimes referred to as the "undisturbed" texture state. The focal-conic texture state can be characterized by the selective reflection of incident light around a wavelength $\lambda_o$ where $\lambda_o = 2np$ where $n$ represents the index of refraction of the liquid crystalline composition and $p$, the pitch, or repetition distance, of the helical structure. The predominate characteristic of the focal-conic texture is its highly diffuse light scattering appearance caused by the distribution of small birefringent domains. This diffuse light scattering appearance is exhibited by optically negative liquid crystalline materials in the focal-conic texture state whether or not the $\lambda_o$ of such materials is in the visible spectrum. Even when $\lambda_o$ for such materials is outside the visible spectrum, the appearance of the focal-conic texture is typically milky white, i.e., white light scattering. Generally, in the case of optically negative liquid crystalline compositions, when a composition is placed in the unbiased electroded member shown in FIG. 1 it may adopt the focal-conic texture state or it may be caused to adopt this form by the use of various techniques known in the art such as, for example, by the application of a D.C. electrical field or by a relatively low frequency A.C. electrical field as is taught in U.S. Pat. No. 3,642,348.

In the advantageous system of the present invention it has been found that when an optically negative liquid crystalline composition including an electrophoretic-like or dipolar additive material is provided in a layered configuration and is provided in the focal-conic texture state the application of a D.C. electrical field of suitable strength or an A.C. electrical field having a relatively low frequency and suitable strength will cause the composition to be transformed to the Grandjean texture state.

The Grandjean texture state, sometimes referred to as the "disturbed" texture state is typically characterized by selective reflection of incident light around a wavelength $\lambda_o$ (as is the case with the focal-conic texture state) and is additionally characterized by optical activity for wavelengths of incident light far from $\lambda_o$. Where $\lambda_o$ is in the visible spectrum the liquid crystal layer appears to have the color corresponding to $\lambda_o$ for normal viewing. Where $\lambda_o$ is outside the visible spectrum the liquid crystal layer appears clear or transparent.

In the liquid crystal imaging member described in FIG. 1, the substantially transparent substrate 12 and the substantially transparent conductive layer 14 of the electrodes may be of any suitable materials. Typical suitable substrates include glass or plastic materials. Typical suitable transparent conductive layers include continuously conductive coatings of conductors, such as tin, indium oxide, aluminum, chromium, tin oxide or any other suitable conductors. These substantially transparent conductive coatings are typically evaporated or sputtered onto the more insulating transparent substrate. NESA glass, a tin oxide coated glass manufactured by the Pittsburgh Plate Glass Company, is a commercially available example of a typical substantially transparent conductive layer coated over a transparent substrate.

The spacer 16 in FIG. 1, which separates the substantially transparent electrodes and contains the liquid crystalline film between the electrodes is typically chemically inert, transparent, not birefringent, substantially insulating and has appropriate dielectric characteristics. Materials suitable for use as insulating spacers include cellulose acetate, cellulose triacetate, cellulose acetate butyrate, polurethane elastomers, polyethylene, polypropylene, polyesters, polystyrene, polycarbonates, polyvinylfluoride, polytetrafluoroethylene, polyethylene terephthalate, and mixtures thereof.

Liquid crystal layer 18 comprises an optically negative liquid crystalline composition comprising an optically negative liquid crystalline component and an additive component which may comprise electrophoretic-like material, dipolar material or mixtures thereof.

Figure 2:
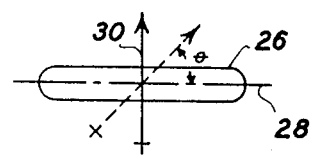
FIG. 2 is a partially schematic representation of an elongate polar molecule illustrating its major molecular axis and its permanent dipole moment.

The optically negative liquid crystalline component typically has a negative dielectric anisotropy, that is, it has a permanent and/or induced dipole moment which is approximately perpendicular to the major axis of the molecules. This is commonly referred to as an off-axis dipole moment. FIG. 2 schematically represents a molecule 26 having a major molecular axis 28 and a permanent dipole moment 30. The net dipole moment comprises the vector sum of the permanent dipole moment of a given molecule and any electrical field induced dipole moment. Of course, depending upon the molecular structure of each individual molecule the acetate angle $\theta$ between the major axis of the molecule and the permanent dipole moment may vary from one compound to another. In the advantageous system of the present invention the acute angle $\theta$ is typically in the range of from about 45° to about 90°. Liquid crystal layer 18 typically has a thickness of from about ¼ mil to about 4 mils and preferably is from about 0.5 mil to about 1 mil in thickness.

Generally, it may be said that the suitable materials have a component of the dipole moment which is smaller along the major axis of the molecules than that normal to it. The value of the dielectric anisotropy can conveniently be used to indicate the relevant dielectric nature of the materials. Typically the materials have a dielectric anisotrophy of about −0.3. The transitions involved in the system of the invention have been observed with optically negative liquid crystalline compositions comprising a cholesteric liquid crystalline material and a nematic liquid crystalline additive material, P-methoxybenzylidene-p'-n-butylaniline, when the conductivity anisotrophy was 1.2 and the resistivity was between about $1 \times 10^{10}$ ohm-cm and $1 \times 10^{11}$ ohm-cm. Of course, these data are illustrative only and not meant to be limiting.

The materials or compositions which are suitable for use as the optically negative liquid crystalline component of the imaging composition exhibit the optical properties of the cholesteric liquid crystalline mesophase and may be said to fall into several categories, examples of which are: cholesteric liquid crystalline material; mixtures of cholesteric and smectic liquid crystalline materials; mixtures of cholesteric liquid crystalline materials and optically active, non-mesomorphic materials; mixture of optically active non-mesomorphic materials and pure, highly electrically resistive nematic liquid crystalline materials; and mixtures thereof. Any of the many known individual materials of each type mentioned may be used where appropriate, in the optically negative component of the imaging compositions.

The additives suitable for use in the present invention typically may be said to fall within two general categories: (1) materials with the electrophoretic-like (specifically including both electrophoretic and dielectrophoretic additives) centers which are capable of moving within the electrooptic liquid crystalline composition when electrical fields are placed across the thickness of the compositions; and (2) dipolar particles which realign themselves and may move within the electrooptic liquid crystalline composition in response to the application of the electrical fields used in the present system. By the term "electrophoretic like" is meant both additives which are insoluble in the optically negative liquid crystalline environment and which become electrically charged when incorporated in that environment and those which are soluble in the optically negative liquid crystalline host including those which can dissociate and form ions therein.

In various embodiments hereof, the advantageous additives may be substantially insoluble and/or immiscible, or substantially soluble and/or miscible, or combinations thereof. The terms insoluble and immiscible herein refer to the substantial insolubility or substantial immiscibility (inability to mix in a single homogeneous phase) of the additives with the electro-optic liquid crystalline composition. Materials suitable for use as the electrophoretic-type additives are typically particles or dispersed globules of substantially electrically insulating materials which become triboelectrically charged in the liquid crystalline composition-additive mixture. Insoluble or immiscible additives of this type include dispersed particulate carbon; polyvinyl chloride; polystyrene; Teflon, tetrafluoroethylene resins available from DuPont; silicon carbide; titanium dioxide; silica; sulfur ammonium chloride; lead chromate; and various other insoluble salts and pigments; polymeric additives such as a copolymer of styrene and n-butyl methacrylate, and even copolymer of styrene and n-butyl methacrylate pigmented with carbon black, and various mixtures and combinations thereof. Such materials are typically used in concentrations which are sufficiently low to allow good suspension or emulsification, without significant conglomeration of the additive material. Such materials are preferably used in concentrations of not greater than about 15 percent. Particles or globules of such materials are typically of average particle size not greater than about 5 microns, and particles of average size not greater than about 1 micron give preferred results in the inventive system.

Where the additives are soluble or miscible, the additive is generally an organically soluble inorganic salt or organically soluble organic compound. Such soluble or miscible additives include alkyl ammonium halides such as tetraheptyl-ammonium iodide and hexadecyl-trimethylammonium bromide; alkyl phosphonium compounds including alkyl phosphonium sulfates, alkyl phosphonium bisulfides, alkyl phosphonium selenides, and alkyl phosphonium phosphates; alkyl sulphonium compounds also including alkyl sulphonium sulfates, alkyl sulphonium bisulfides, alkyl sulphonium selenides and alkyl sulphonium phosphates, anils such as p-methoxy-benzylidene-p'-n-butylaniline as well as mixtures thereof and others.

Materials typically suitable for use as dipolar-type additives include various dispersed oils such as cottonseed oil, castor oil, silicone oils, linseed oil, mineral oil, polysulphone and others. Other such materials include acetonitrile, diethylamine, iodine, ethyl dichloride, amyl acetate, butyl acetate, and other alkyl acetates; diethyl ether, monochlorobenzene, toluene, metaxylene, anisole, n-propyl chloride, chloroform, steric acid, xylol, carnauba wax, nitrobenzene, polyvinyl chloride, ammonium chloride, mixtures thereof and others. In some embodiments, the above materials may also behave as electrophoretic-like materials, as described above.

Generally the additive content of the imaging composition may vary over a wide range. The advantageous texture transformation of the invention can be obtained with optically negative liquid crystalline compositions wherein the additive material comprises from about 0.25 % to about 95% by weight of the composition.

As noted previously potential source 22 may comprise a source of D.C. potential, a source of A.C. potential or a combination thereof.

In one embodiment of the invention a layer of an imaging composition used according to the invention may be initially provided in the Grandjean state, transformed to the focal-conic textue state by the application of a D.C. electrical field and subsequently caused to return to the Grandjean texture state by increasing the magnitude of the applied D.C. electrical field.

This preferred embodiment may be utilized to image and erase a liquid crystalline imaging member. Following is a discussion of a proposed theoretical mechanism by which this embodiment of the invention is operative. It should be noted that the inventive system has been observed to be operative through experimentation and there is no intention to limit the operation of the system to any proposed theory of operation; nevertheless the proposed theoretical mechanism is consistent with observed results and is presented here to better aid those skilled in the art to understand and practice the invention.

Consider at least a binary mixture comprising A and B which is optically negative in nature. Both A and B have anisotropic conductivities and permanent and induced dipole moments. The dipole moments can act in accord with or in opposition to each other in electric field interactions. The alignment of molecules due to permanent dipole-field torques varies with field as E, whereas that due to the induced torques varies as $E^2$. Thus, the induced torques may prevail at high fields.

Therefore, whereas other interactions modifying aignment of molecules such as those due to ionic, electrophoretic or conductivity-anisotropy effects can be expected to dominate at lower electrical fields, dipolar interaction should prevail at higher fields effecing an alignment consonant with the net dielectric anisotropy (provided, of course, the sample is not destroyed at these higher fields).

In the optically negative liquid crystalline imaging composition utilized in the present system, the material which comprises the optically negative liquid crystalline component has an off-axis dipole moment and application of appropriate electrical fields thereto promotes and induces a planar, or Grandjean, alignment in the material.

The addition of scattering sites, ions, electrophoretic and/or dielectrophoretic material to optically negative liquid crystalline systems tends to destroy the planar arrangement when electrical fields are applied to the systems because the electrical fields makes these additives mechanically move through the optically negative material or rearrange themselves. Thus, two competing effects occur; the disruptive one caused by moving or rearranging the additive materials and the aligning effect caused by the dipolar interaction. In some systems the dipole interaction is weaker than that due to the additive so that the former may become evident only at higher fields whereas the latter will predominate at relatively lower fields. In the system of the present invention it is thought that the Grandjean to focal-conic transition occurs because of ionic, electrophoretic, dielectrophoretic or conductivity anisotropy effects, i.e., those due to the interaction of the additive material with the applied electrical field which predominate at the lower field strengths. The focal-conic to Grandjean transition is thought to then occur at relatively higher fields via coupling to dielectric moments or both conductivity and dielectric anisotropies. The interaction of the additive material with the electrical field is thought to saturate with field and the dipole interaction then is thought to become great enough at higher fields to enforce the planar, or Grandjean, alignment.

It should be noted that a layer of imaging composition may be initially provided in the focal-conic texture state, transformed to the Grandjean texture state by the application of a relatively high D.C. electrical field and substantially caused to return to the focal-conic texture state by decreasing the magnitude of the applied D.C. electrical field.

Figure 3:
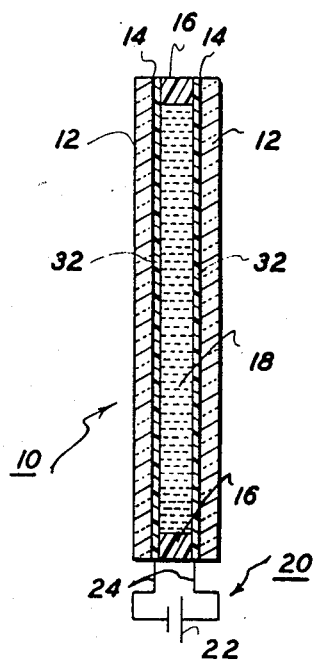
FIG. 3 is a partially schematic cross-sectional view of another embodiment of a liquid crystalline imaging member.

According to another preferred embodiment of the invention an optically negative liquid crystalline composition may be transformed from the Grandjean texture to the focal-conic texture and then caused to return to the Grandjean state by means of a pulsed D.C. electrical field. This embodiment requires an electroded cell which comprises a pair of non-injecting electrodes, that is, electrodes which will not undergo any appreciable charge exchange with charge carriers in the liquid crystalline composition. There is illustrated in FIG. 3 an electroded cell suitable for practicing this embodiment of the invention. The cell shown in FIG. 3 is similar to that shown in FIG. 1 with the exception of optional blocking material layers 32.

The optically negative liquid crystal layer 18 is provided initially in the Grandjean texture and a D.C. electrical pulse of a given magnitude, width and polarity is applied across the layer to cause movement of ions and current flow in the liquid crystalline composition. As the current becomes substantially zero the electrical pulse is terminated and the liquid crystalline composition adopts the focal-conic texture state. In order to cause the composition to return to the Grandjean state another D.C. electrical pulse of the same polarity is applied across the layer in the same direction. The magnitude and width of the second electrical pulse may be the same or different than those of the initial pulse depending upon the speed of the system.

It is thought that this embodiment of the invention is operative because the charge carriers generated within the liquid crystalline composition due to the initial D.C. electrical pulse are immobilized at the surfaces of the electrodes and prevent any further current flow. When this condition is achieved the composition adopts the focal-conic texture. Subsequently, application of an electrical field causes the electrical field effects to predominate and the composition adopts the Grandjean texture state.

It should be understood that the term "non-injecting electrode" is intended to include those which include a layer or a surface of blocking material and those which comprise a layer of a conductive material having a work function much higher than that of the liquid crystalline composition, for example, chromium. By the term "blocking layer" is meant those which will prevent or greatly retard the injection of charge carriers into the liquid crystalline composition. These optional blocking layers 32 of the electrodes may be of any suitable material which will prevent or greatly retard the injection of charge carriers into the liquid crystalline composition. Blocking layers 32 typically have a thickness in the range of from about 20A to about 1 micron and typically are optically isotropic (not birefringent) in the direction of viewing. Suitable blocking materials typically have a bulk resistivity of from about $10^9$ to about $10^{16}$ ohm-cm or higher. Typical suitable blocking materials include, for example, glass, fused silica, films of polyvinylchloride, polyvinylidenefluoride, poly-n-vinylcarbazole; or Teflon, a polytetrafluoroethylene, Mylar, a polyethylene terephtholate, Tedlar, a polyvinylfluoride (available from duPont); mixtures thereof and the like.

The advantageous system of the present invention may also be utilized to provide a transient display. This embodiment of the invention also requires a display cell comprising a pair of non-injecting electrodes such as is illustrated in FIG. 3. In one embodiment an optically negative liquid crystalline composition initially provided in the Grandjean texture state may be transformed to the focal-conic texture and then back to the Grandjean state by an applied D.C. electrical field without changing the magnitude of the field. Where it is desired to utilize this embodiment in a a recyclible mode, the polarity of the electrical field must be reversed after every complete cycle.

A similar transient display may be provided by means of a pulsed D.C. electrical field. In this instance only a single pulse is applied across the imaging layer with the width of the pulse being wider than the width of the pulses applied in the embodiment described above herein where two D.C. electrical field pulses are applied to obtain a Grandjean to focal-conic to Grandjean transformation.

Figure 4:
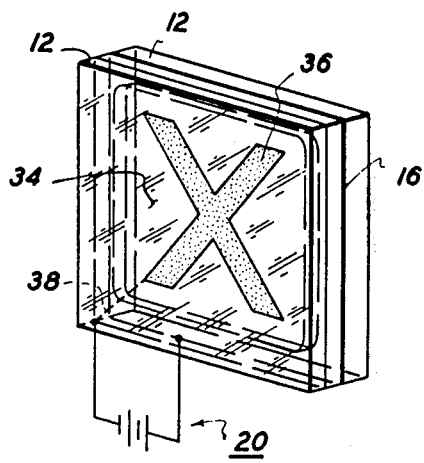
FIG. 4 is a perspective view of another embodiment of a liquid crystalline imaging member.

As previously noted the advantageous electrical field induced texture transformations may be used to image a liquid crystal imaging member or to provide a display. FIG. 4 illustrates one embodiment of a liquid crystal imaging member wherein the desired image is defined by the shape of an electrode and therefore by the shape of the applied electrical field. Here the imaging member comprises transparent support plates 12 separated by spacer gasket 16 having void area 34 filled with liquid crystalline material and comprising substantially the entire area of spacer member 16. The desired image is defined by the shape of the substantially transparent conductive coating 36 which is affixed to the inner surface of one or both of the transparent support plates 12 and is affixed only in the desired image configurations. A very thin, or substantially transparent conductor 38 is necessary in this embodiment to electrically connect the electrode in the desired image configuration to external circuit 20.

In operation this embodiment will produce an electrical field only in those areas where there are parallel electrodes, i.e., between the electrode in the desired image configuration and the opposite electrode whether or not the second electrode is also in the desired image configuration.

It is again noted that one of the electrodes may be opaque if it is desired to observe the imaged member by reflected light rather than transmitted light. Initially, the optically negative liquid crystalline material is provided in the Grandjean texture state and in the unbiased imaging member will appear clear or colored depending upon whether the $\lambda_o$ value of the material is outside of or within the visible spectrum as previously described. When the image wise electrical field which may be a D.C. field or a relatively low frequency A.C. field in the Grandjean to focal-conic texture transformation electrical field strength range of the imaging composition is established across the liquid crystalline film, the induced texture transformation will be observed because the field-affected, or image, areas will appear milky white and light scattering (characteristic of the focal-conic texture state) whereas the background areas will continue to appear clear. The imaged member may also be viewed with the aid of image enhancement means such as, for example, between linear polarizers when the image is viewed in transmitted light or with a circular polarizer when the image is viewed in reflection.

Subsequently a relatively low frequency, higher magnitude A.C. field or a higher magnitude D.C. electrical field which is within the focal-conic to Grandjean texture transformation electrical field strength range of the imaging composition is applied and the field-affected areas are caused to return to the Grandjean texture state. It should be noted that Grandjean state at the relatively higher electrical field is not exactly the same as that at relatively low or zero field because the pitch of the imaging composition is affected by the field.

Thus, in that embodiment the wavelengths reflected by the optically negative composition and the optical activity thereof will be somewhat different that the corresponding values at the zero field condition. Accordingly, if the $\lambda_o$ value of the optically negative imaging composition is in the visible spectrum the field-affected, or image, areas of the liquid crystal film will reflect a different color or hue than the background areas of the film with the result that an image or one color on a background of a different color or hue will be observed. Of course, if the imaging composition has a $\lambda_o$ value outside the visible spectrum the entire liquid crystal film will appear clear when viewed without the use of polarizers; nevertheless the image areas of the liquid crystal film will exhibit different optical activity than the background areas and then differences can be exploited by the use of polarizers or other appropriate means as will be apparent to those skilled in the art. The entire film may be placed in a uniform condition by various techniques such as removing the voltage, applying a shearing force to the film, applying appropriate eletrical fields, etc. It should be also noted that any of the embodiments of the invention described herein may be used to image an imaging member.

Figure 5:
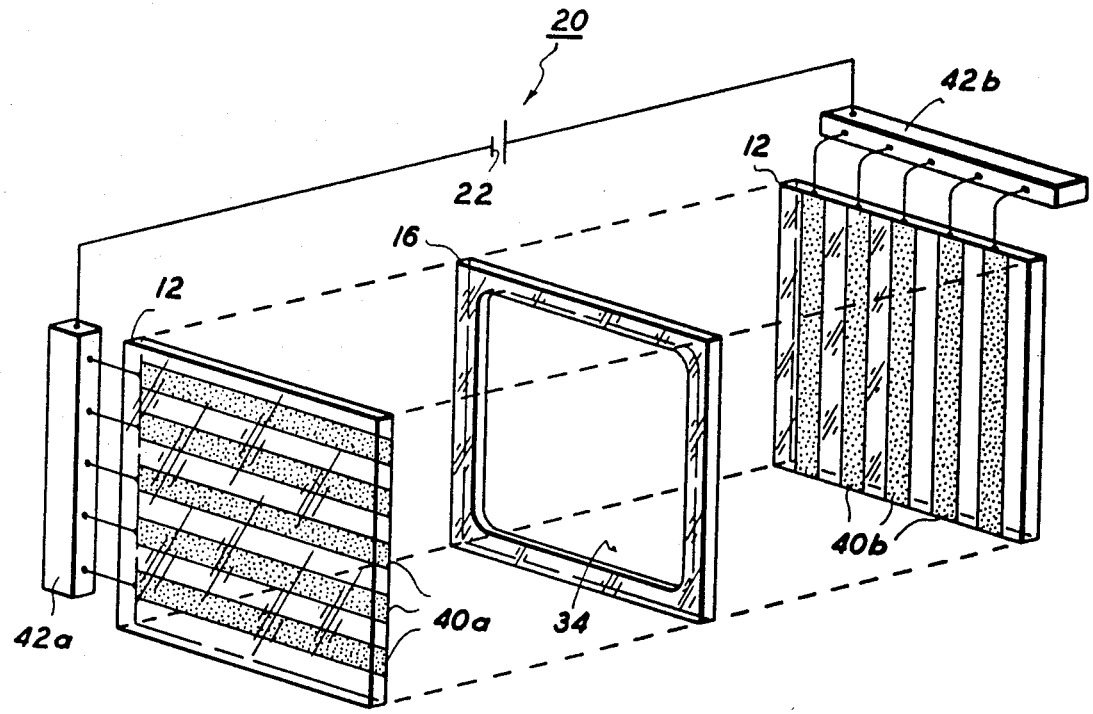
FIG. 5 is an exploded isometric view of an imaging system wherein a liquid crystalline imaging member is imaged by an X–Y address system.

In FIG. 5 an X–Y address system suitable for imaging a liquid crystalline imaging member is illustrated in exploded isometric view. The liquid crystalline imaging film is placed in void area 34 within the transparent and substantially insulating spacer gasket 16. The liquid crystalline film and the spacer are sandwiched between a pair of substantially transparent support plates 12 upon which strips of substantially transparent conductive material 40 are coated. The substantially transparent electrodes are oriented so that conductive strips 40b and conductive strips 40a on the respective electrodes cross each other in an X–Y matrix or grid. Each conductive strip in each set of parallel strips 40a and 40b is electrically connected to a circuit system 42 which is suitable for selective or sequential operation. Through selection systems 42 and external circuit 20 including a source of potential 22, an electric field suitable for imaging the optically negative liquid crystalline material can be created across selected points or a selected sequence of points. It will be understood that substantially transparent conductive strips 40 may vary in width from a very fine, wire-like structure to any desired strip width. In addition, one support plate 12 may be opaque where the imaging system is to be observed in reflected light.

Figure 6:
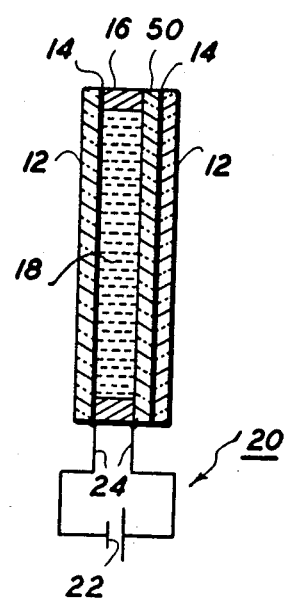
FIG. 6 is a partially schematic, cross-sectional view of an imaging system wherein a liquid crystalline imaging member includes a photoconductive insulating layer.

FIG. 6 describes another preferred embodiment of a liquid crystalline imaging member wherein one of the electrodes has adjacent thereto a photoconductive insulating layer and imaging is effected by applying a uniform potential across the entire area of the electrodes and exposing the photoconductive insulating layer 50 to an imagewise pattern of activating electromagnetic radiation corresponding to a desired image configuration. In operation of the device, an imagewise pattern of activating radiation is directed upon the imaging member from the right side while an electric field is established between the electrodes by means of external circuit 20 to opposite sides of which are connected conductive layers 14 of the respective electrodes. Accordingly, an imagewise electric field is established across the liquid crystalline film 18 and causes the desired texture change. Of course, photoconductive layer 50 may comprise any suitable photoconductive insulating material such as selenium or any of the many materials which are known for use in the xerographic reproduction process. A light source for providing the incident collimated monochromatic light may be arranged on either side of the imaging member.

When it is desired to view the imaging member using transmitted light, it is required that both electrodes be substantially transparent. Of course, in this instance, there is required a photoconductive insulating layer which is substantially transparent to the viewing radiation. Typical suitable substantially transparent photoconductive materials include, for example, relatively thin (about 5 microns) layers of selenium. The imaging member may also be viewed using reflected light in which case only a single transparent electrode is required while the other may be opaque. Again, it is noted that the sources of potential used in the circuits which produce the electric fields in the various address systems suitable for use in the advantageous imaging system of the present invention may be either A.C., D.C., or combinations thereof.

It should be noted that any other technique for providing imagewise electrical fields across a liquid crystalline film may be employed to provide images according to the advantageous texture transformation system of the present invention. Other suitable techniques include, for example, electron beam address systems and uni-planar multiple cell systems.

For a detailed description of the above mentioned address systems see U.S. Pat. No. 3,652,148. Since there is a threshold in the formation of both the focal-conic texture state and the subsequent formation of the Grandjean texture state at the higher electrical field levels the advantageous texture transformation system is particularly well suited for use in matrix address display systems. Additionally, because considerable latitude is possible in selecting the additive or additives to provide the focal-conic texture state at the lower voltage levels, additives which maintain the relatively high impedance characteristics typically exhibited by some optically negative liquid crystalline materials or compositions may be selected with a consequent saving in power input.

EXAMPLES

The advantageous system of the present invention will be further described with respect to specific preferred embodiments by way of examples, it being understood that these are intended to be illustrative only and the invention is not limited to the materials, conditions or procedures recited therein. In each example, unless otherwise specified, there is employed an electroded cell comprising a pair of NESA glass electrodes separated by an approximately 1 mil thick mylar spacer having a void area therein to contain the liquid crystalline imaging composition. All parts and percentages are by weight unless otherwise specified.

EXAMPLE I

A film of an optically negative liquid crystalline composition comprising about 80% p-methoxybenzylidene-p'-n-butylaniline (ABUTA) and about 20% cholesteryl nonanoate was formed in the imaging cell and maintained at a temperature of about 25° C. The film was provided initially in the Grandjean texture state. For D.C. voltages of up to about 200 volts the imaging material was converted to the focal-conic texture. Above about 200 volts the imaging composition reverted to the Grandjean texture.

EXAMPLE II

A film of an imaging composition comprising about 79.5% ABUTA and about 20.5% allyl cholesteryl chloride was placed in the imaging cell. At a temperature of about 25° C the imaging composition was in the Grandjean texture. For D.C. voltages of up to about 100 volts the liquid crystalline composition was transformed to the focal-conic texture and dynamic scattering was observed. At voltages of from about 200–300 volts the Grandjean texture was again reinstated.

The same sample was again placed in the Grandjean texture and held at about 35° C. At a D.C. voltage of about 40 volts the composition was transformed to the focal-conic texture and dynamic scattering was observed. At about 100 volts the sample scattered light vigorously. At about 200 volts the Grandjean texture began to form. With about 300 volts an almost perfect planar texture was observed and at about 400 volts the composition was still in the planar texture with a very small density of scattering spots.

The sample was placed in the Grandjean texture state and maintained at a temperature of about 45° C. At a voltage of about 20 volts the composition was focal-conic and scattering. At a voltage of about 100 volts vigorous dynamic scattering was observed. At about 300 volts clear areas formed and these became more extensive at about 400 volts. The size of the planar areas became still larger at about 500 volts but the liquid crystal film, still exhibited a high density of dynamic scattering spots. The isotropic temperature of the imaging composition is about 47.6° C.

EXAMPLE III

A film of a composition comprising about 79.5% ABUTA and about 20.5% allyl cholesteryl chloride was placed in an electroded cell. The composition was partially in the Grandjean texture initially and exhibited an optical rotation of about 116° for 549 m$\mu$ light. At a voltage of about 30 volts the composition adopted the focal-conic texture via dynamic scattering. At about 100 volts the dynamic scattering was vigorous. At about 390 volts some areas of the liquid crystal film returned to the Grandjean texture and some continued to exhibit dynamic scattering. At this point the optical rotation was about 140°. At about 500 volts the liquid crystalline material was in the Grandjean texture and the rotation was about 140°. The planar texture remained when the voltage was removed and the rotation was about 125°. When a field of about 500 volts was applied directly across the liquid crystal film it adopted the planar texture and the rotation was about 135°.

EXAMPLE IV

A film of a liquid crystalline composition comprising about 80% ABUTA and about 20% cholesteryl nonanoate was placed in an electrode cell having one electrode made up of a chromium layer on a glass substrate. At about 25° C the composition was partially planar and had a broad optical rotation curve centered at a rotation of 35°. At applied fields of up to about 300 volts the composition was focal-conic and exhbited dynamic scattering. At about 300 volts the planar texture began to form and less dynamic scattering was observed. At about 800 volts the composition was predominately planar but continued to exhibit some dynamic scattering.

EXAMPLE V

A film of a liquid crystalline composition comprising about 30.8% $\Delta^{*14}$ - cholesteryl hexyl carbonate about 69.2% cholesteryl nonanoate was formed in an electroded cell having chrome-plated electrodes and maintained at a temperature of about 53° C. Initially the composition was planar. At D.C. fields of from about 100 to about 200 volts a transient planar to focal-conic to planar transition was induced. The charged material deposited at the electrodes. In order to obtain the transient transition again it was necessary to reverse the polarity of the field.

The transient texture change was also observed with a 0.2 Hz A.C. voltage.

EXAMPLE VI

The procedure described in Example V was repeated with the exception that a trace of pulverized salt (NACL) was added to the liquid crystal composition. Similar results were obtained. An advantage of this transient texture change mode is that the resistivity of the composition increases after the charged particles are deposited.

EXAMPLE VII

A film of a liquid crystalline composition comprising about 99.75% cholesteryl nonanoate and about 0.25% tetraheptylammonium iodide (TI) was formed in an electrode cell. The TI was obtained from Eastman Kodak, Catalogue No. 7630 and purified by recrystallization. The material was maintained at about 85° C. Initially the composition was in the planar texture. At a D.C. field of about 100 volts the composition exhibited dynamic scattering and became focal-conic. At about 200 volts some areas of the film were planar and some remained in the dynamic scattering condition.

At about 300 volts the composition was predominately in the planar texture with little observable scattering. At this point when the composition was observed through a polarizing microscope with convergent light and crossed polarizers the conoscopic color figure showed a negative birefringent characteristic.

When the same composition was subjected to 900 volt A.C. fields of from about 10 to about 100 Hz the composition adopted the dynamic scattering state. At a frequency of about 500 Hz the dynamic scattering stopped and a planar texture was formed.

EXAMPLE VIII

A film of a liquid crystalline composition comprising about 99.66% cholesteryl nonanoate and about 0.34% hexadecyltrimethylammonium bromide (obtained from Eastman Kodak Co.) was formed in an electroded cell maintained at about 85° C. At A.C. fields of 360 volts and frequencies of from about 1 to about 100 Hz the composition was in the dynamic scattering condition. At frequencies above 100 Hz and up to 200 Hz the composition was in the planar texture. The voltage was raised to about 660 volts and the composition reverted to the focal-conic scattering texture which remained when the voltage was removed.

The composition was subjected to a D.C. field of about 100 volts and went from the planar to the focal-conic texture. At about 200 volts the texture reverted to the planar form.

It will be understood that various other changes in the details, materials, steps and arrangement of elements which have been described herein and illustrated in order to explain the nature of the invention will occur to and may be made by those skilled in the art upon a reading of this disclosure and such modifications are intended to be included within the principle of the invention and the scope of the claims.

What is claimed is:
1. A method for transforming an optically negative liquid crystalline composition from the Grandjean texture state to the focal-conic texture state and back to the Grandjean texture state, comprising the steps of:
   a. providing between a pair of non-injecting electrodes, at least one of which is transparent, a layer of an optically negative liquid crystalline composition in the Grandjean texture state comprising an optically negative liquid crystalline material and an additive, said additive comprising a material selected from the group consisting of electrophoretic materials, dielectrophoretic materials, dipolar materials and mixtures thereof; and
   b. transforming said composition into the focal-conic texture state and then into the Grandjean texture state by applying a D.C. electrical field between said two electrodes and without changing the magnitude of said applied D.C. electrical field.

2. The method of claim 1 wherein step (b) is repeated at least once wherein the polarity of the D.C. electrical field in the repeated step is opposite to that in step (b).

3. The method of claim 1 wherein step (b) is repeated a plurality of times and wherein the polarity of the D.C. electrical field in each repetition is reversed to that of the preceeding repetition.

* * * * *